United States Patent [19]

Jackson

[11] Patent Number: 4,508,621
[45] Date of Patent: Apr. 2, 1985

[54] FILTRATION AND SEPARATION DEVICE

[76] Inventor: Henry D. Jackson, 6 Glenora Mews, Andalusia Ave., Somerset W., Cape Province, South Africa

[21] Appl. No.: 536,451

[22] Filed: Sep. 28, 1983

Related U.S. Application Data

[63] Continuation-in-part of Ser. No. 312,918, Oct. 19, 1981, abandoned.

[51] Int. Cl.³ ............................................ B01D 35/14
[52] U.S. Cl. ..................................... 210/86; 210/111; 210/123; 210/512.1; 210/533
[58] Field of Search ................. 210/86, 111, 119, 123, 210/304, 309, 451, 452, 457, 512.1, 535, 787, 788, 799, 800, 416.4, 416.5, 533; 55/459 R; 209/144, 211; 137/172, 195, 412

[56] References Cited

U.S. PATENT DOCUMENTS

| | | | |
|---|---|---|---|
| 2,244,574 | 6/1941 | Rogers | 210/304 |
| 2,390,841 | 12/1945 | Longden | 210/304 |
| 3,868,321 | 2/1975 | Gough | 210/86 |
| 3,916,936 | 11/1975 | Villaume et al. | 137/195 |
| 4,010,101 | 3/1977 | Davey | 210/86 |
| 4,276,161 | 6/1981 | Matsui et al. | 210/86 |

Primary Examiner—Richard V. Fisher
Assistant Examiner—Wanda L. Millard
Attorney, Agent, or Firm—LeBlanc, Nolan, Shur & Nies

[57] ABSTRACT

A device which may be connected to a liquid supply line for use in separating a foreign liquid and particulate matter contained in a supply liquid, wherein the foreign liquid has a specific gravity greater than that of the supply liquid. The device is particularly suitable for separating water and dirt particles from a liquid fuel. The device includes: a generally cylindrical housing containing a settling chamber having a settling zone at a lower region of the housing and a displacement zone at an upper region of the housing; an outlet chamber surrounding the settling chamber in the upper region of the housing; an inlet located tangential to the housing and leading into the settling chamber; an outlet leading from the top of the outlet chamber; a cylindrical filter screen which separates the settling and outlet chambers and which defines flow paths connecting the settling chamber with the outlet chamber so that liquid passing through the chambers from the inlet to the outlet passes through the filter screen from the interior to the exterior thereof; and detecting means including a float warning mechanism for detecting the presence of a predetermined level of foreign liquid in the settling chamber. The device provides for rotational flow of liquid and includes features which result in a minimum amount of interference with the quiet zone that exists in the center of a rotating body of liquid, thus contributing to maximizing the opportunity for separation of water and dirt from a liquid fuel.

19 Claims, 4 Drawing Figures 4,508,621

FILTRATION AND SEPARATION DEVICE

BACKGROUND AND SUMMARY OF THE INVENTION

This is a continuation-in-part of application Ser. No. 312,918 filed Oct. 19, 1981, now abandoned.

The present invention relates to a filtering device which may be connected to a liquid supply line for use in separating a foreign liquid and particulate matter contained in a supply liquid, wherein the foreign liquid has a specific gravity greater than that of the supply liquid. The present invention is particularly suitable for connection to the fuel supply line of an internal combustion engine in order to separate water and dirt particles from the liquid fuel.

Previous devices for use in separating and filtering foreign liquids and other extraneous matter from a supply liquid, wherein the foreign liquid has a specific gravity greater than that of the supply liquid, have included devices which utilize various arrangements of absorbent filter cartridges, baffles, screens, flanges, and settling areas for the purpose of providing at the outlet of the device a supply liquid having the lowest possible contamination with water and particulate matter.

By the present invention there is provided an improved filter device in which separation of the foreign liquid and particulate matter from the supply liquid is maximized in a settling chamber by passing the incoming liquid from a tangentially located inlet in a rotational flow pattern through an unrestricted portion of the device which is of maximum volume relative to the overall dimensions of the device. The settling chamber of the device is so constructed as to allow maximum gravitational separation of foreign liquid and particulate materials in the quiescent zone that exists in the center of an unrestricted rotating body of liquid, i.e., the "eye of the hurricane" principle.

The filter device of the present invention employs a generally cylindrical filter screen, open at the lower end and closed at the upper end, which is mounted coaxially within the upper region of the filter device between the inlet and the outlet. The filter screen defines the boundary between the two chambers of the device, i.e., the settling chamber and the outlet chamber.

The present invention provides for a completely unobstructed flow path within the settling chamber across the width of the housing from one side wall of the housing to the other in proximity to the horizontal level at which liquid enters the device through the tangential inlet, i.e., the horizontal plane of the inlet. Thus there are no structural components of the present device which are positioned within the walls of the device at or adjacent to this level which could in any way obstruct rotational flow of incoming liquid.

The filter device of the present invention is provided with a float warning mechanism in which the float is constructed with a specific gravity greater than the supply liquid but less than the foreign liquid and is positioned to move vertically on a column with respect to an internally mounted reed switch within the column. The float is mounted so as to be rotatable with the flow of liquid surrounding the float, thus enhancing the reliability of the float due to the capability for free movement thereof which eliminates the possibility of jamming.

The filtration and separation device of the present invention includes: a generally cylindrical housing containing a settling chamber with a settling zone at a lower region of the housing and a displacement zone at an upper region of the housing; an outlet chamber surrounding the settling chamber in the upper region of the housing; an inlet located tangential to the housing and leading into the settling chamber; an outlet leading from the top of the outlet chamber; a cylindrical filter screen which separates the settling and outlet chambers and which defines flow paths connecting the settling chamber with the outlet chamber so that liquid passing through the chambers from the inlet to the outlet passes through the filter screen; and detecting means in the form of a float warning mechanism for detecting the presence of a predetermined amount of foreign liquids in the settling zone, said detecting means being connectable to an electrical signal circuit for causing a signal in response to detection of the foreign liquids.

In accordance with the invention, the settling chamber of the present device is of significantly larger volume than the outlet chamber, and the inlet opens tangentially into a substantially cylindrical portion of the settling chamber, essentially at the boundary between the displacement zone and the settling zone, to permit uninhibited flow of the liquid into the settling chamber for creating rotational flow within the settling chamber. This arrangement allows the larger drops of foreign liquid having a greater specific gravity than that of the supply liquid to fall directly into the settling zone without being broken up against any internal obstruction.

The settling zone includes that portion of the settling chamber located below the inlet. Once the settling zone is initially filled, no further displacement of supply liquid into and out of the zone will occur other than that displaced by foreign liquid settling in this zone. The displacement zone includes that portion of the settling chamber from the inlet upwards. In the displacement zone, supply liquid is continuously being displaced during operation of the device from the inlet upwardly in a rotational pattern and the foreign liquid and particulate matter which do not separate initially upon entering the settling chamber will also move upwardly with the supply liquid.

In a preferred embodiment, the main portion of the displacement zone within the settling chamber is surrounded by the outlet chamber in the upper region of the device and the tangential inlet opens into the settling chamber at a position below the outlet chamber and at the upper limit of the settling zone, the inlet allowing fluid initially to flow alongside the wall of the housing to create rotational flow conditions within the settling chamber and throughout the housing. The provision of the outlet chamber such that it surrounds the upper region of the settling chamber results in droplets of foreign liquid which are not separated from the supply liquid as the liquids first enter the settling chamber being raised by the rotational flow within the settling chamber and thus having increased time in which to settle before reaching the filter screen.

According to a further aspect of the invention, the settling chamber is surrounded by the housing at its lower portion and by the filter screen at its upper portion so that the outlet chamber surrounds an upper part of the settling chamber. With this arrangement, rotational flow of liquid within the settling chamber can cause droplets of foreign liquid that are not separated by gravity to be carried upwardly within the displacement zone of the settling chamber until they move against the filter screen and then to be moved around the filter screen and to progressively agglomerate. The agglomerated droplets may fall directly from the filter screen or may be raised to the top of the screen where they can move inwardly with respect to the settling chamber until they fall downwardly through the displacement zone and the settling zone, all the while moving through the quiescent zone that exists in the center of the unrestricted rotating body of liquid. Dirt and other particulate matter can be separated from the supply liquid in the same manner.

The rotational flow pattern obtained in the present device assists the agglomeration process whereby droplets of the foreign liquid such as water and also particulate matter such as dirt will tend to move toward the quiescent central zone in proximity to the vertical axis of the device, thus meeting up with each other, agglomerating and becoming heavier and moving into the settling zone in the lower end of the device. In so doing, the cylindrical filter screen is so arranged as to pose no obstacle to continued rotational flow in the settling chamber, but with water and particulate matter being retained by the screen as the supply liquid passes through it.

As the body of liquid rotates against the screen, passing from the interior to the exterior thereof, the liquid continually dislodges accumulated dirt from the interior of the screen, which dirt then tends towards the quiescent zone at the center of the rotating body of liquid and then downwardly to the lower region of the settling chamber. Thus there is provided a self cleaning action. With the general flow of liquid being from inside the screen to the exterior thereof, the filter screen does not interfere with the free movement of water and dirt towards the central quiescent zone through the vertical axis of the device and then downwardly to the settling zone.

In the manner as described above, the present device provides a minimum amount of interference with the quiet zone that exists in the center of a rotating body of liquid, i.e., the "eye of the hurricane" principle, thus contributing to maximizing the opportunity for separation of water and dirt from the liquid fuel.

The filter and separation device of the present invention in essence allows a supply liquid to pass from one restricted area of flow, i.e, the inlet, to another restricted area of flow, i.e., the outlet, via an area of expansion and rotational flow in which the supply liquid is allowed to flow upwardly, resulting in separation of a foreign liquid having a specific gravity greater than that of the supply liquid, as well as particulate matter, from the supply liquid.

The present invention as thus described is distinguished from previous devices such as that described in U.S. Pat. No. 4,298,465 to Druffel, with the distinctions from the present invention including the fact that the main body of liquid flow in the Druffel device changes direction from downward to upward, whereas in the invention the main body of flow is in one direction only, such direction being upwardly, and this upward flow path assists in gravitational separation of heavier liquid from lighter liquid.

The distinctions of the present invention over the device of U.S. Pat. No. 3,386,581 to Gough include the fact that the Gough device does not have a tangential inlet and the center portion of the main chamber is obstructed so that there is no quiescent central zone for separation. Similarly, the device of U.S. Pat. No. 2,390,841 to Longden does not have a quiescent central area, since the central portion of the Longden device is obstructed by a filter screen.

Accordingly, it is an object of the present invention to provide a liquid filter and separator having maximum capability for removing a foreign liquid and particulate matter from a supply liquid.

It is a further object of the invention to establish a body of liquid located within a filtering device in unrestricted rotational movement for the purpose of separating and filtering a foreign liquid and particulate materials from a supply liquid, wherein the foreign liquid has a specific gravity greater than that of the supply liquid.

It is another object of the invention to provide a filter separation device having a maximum unobstructed central portion for allowing gravitational separation of a foreign liquid and particulate matter from a rotating body of liquid, wherein the foreign liquid has a specific gravity greater than that of the supply liquid.

It is an additional object of the invention to provide a generally cylindrical filter screen construction located between the inlet and outlet of a liquid filter separator device, with the direction of liquid flow between inlet and outlet being upwardly and from the interior of the filter screen to the exterior thereof, and with rotational liquid flow occurring on the interior and also the exterior of the filter screen, said rotational flow contributing to the separation and filtration of foreign liquids and particulate matter from a supply liquid.

It is another object of the invention to provide an improved float warning mechanism for use in causing a signal whenever foreign liquids have accumulated in the settling chamber to the extent that the chamber should be drained, wherein the warning mechanism is a balanced system, being compact, streamlined and located out of the flow area between inlet and outlet, and with the float being freely rotatable with the overall rotational pattern of liquid within the device.

The foregoing and additional objects of the present invention will be more fully understood from the following description of the preferred embodiments, taken in conjunction with the accompanying drawings.

DESCRIPTION OF THE PREFERRED EMBODIMENTS

Figure 1:
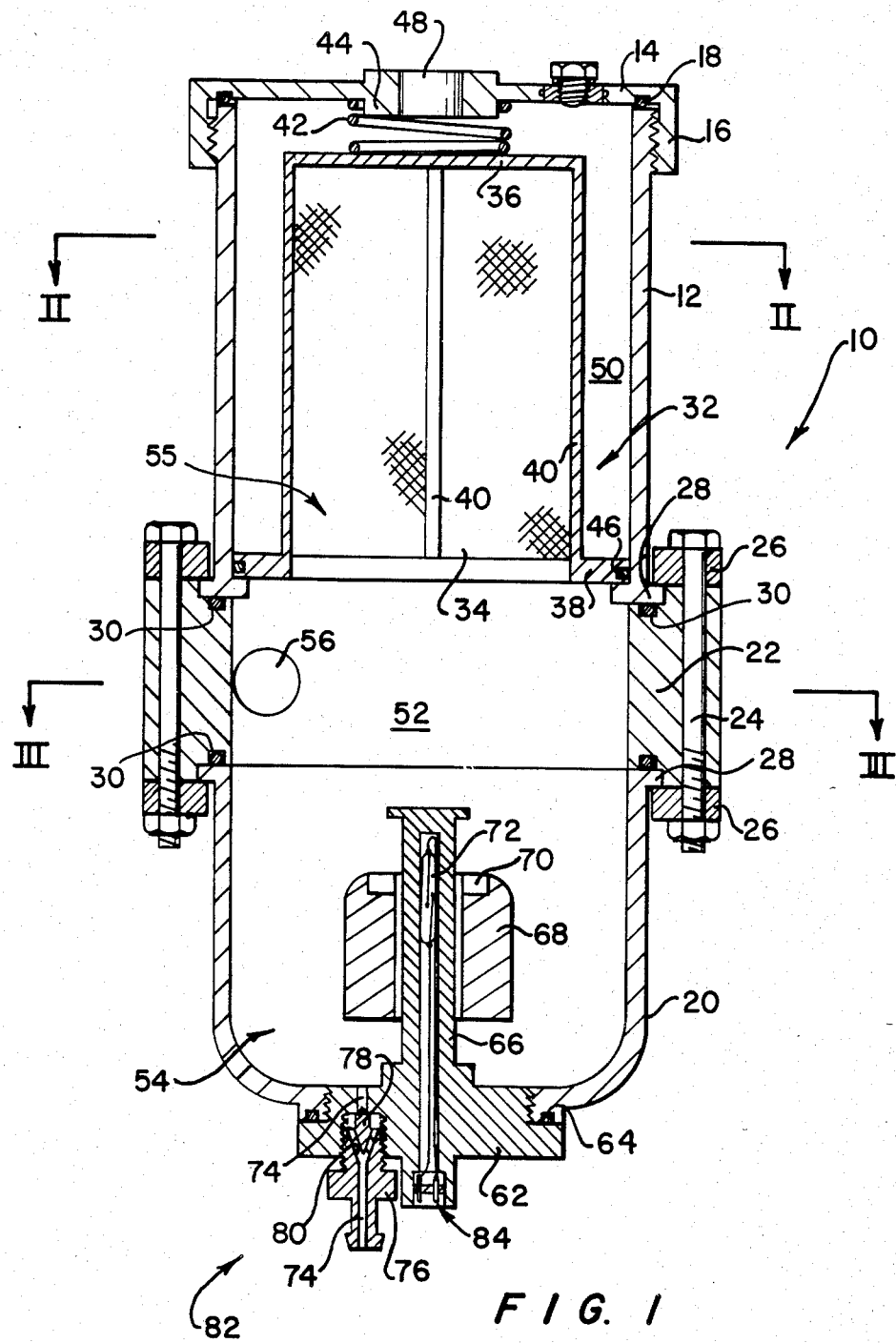
FIG. 1 is a cross-sectional side view of a filtration and separation device according to the invention.
Figure 2:
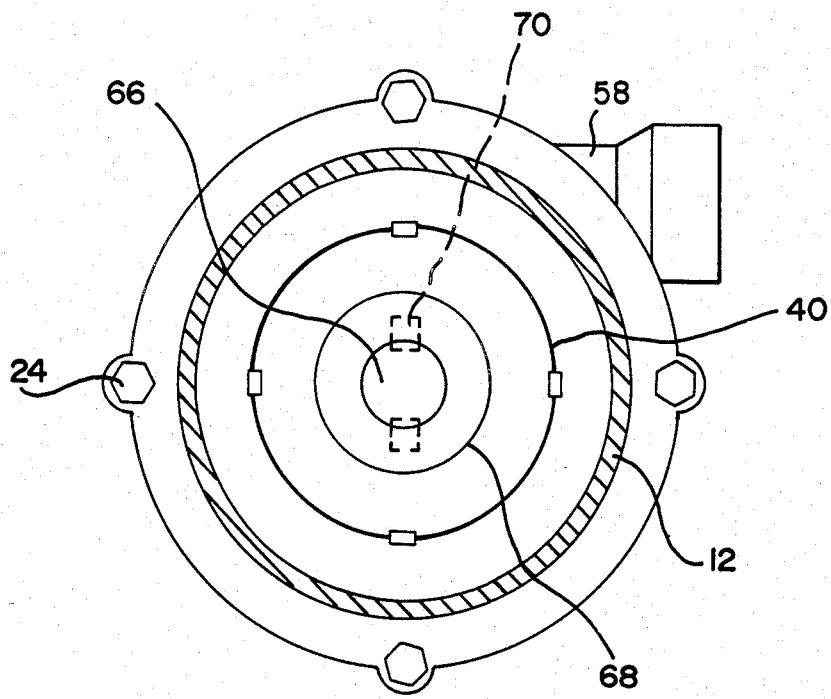
FIG. 2 is a sectional plan view taken on line II—II of FIG. 1.

In the embodiment of the invention as shown in FIGS. 1 through 4, there is provided a filtration and separation device having a housing 10 for connection in a liquid supply line, such as a fuel line, for filtering and separating foreign liquids contained in a supply liquid and having a specific gravity greater than that of the supply liquid. The device is particularly suitable for separating water contained in petroleum fuels such as diesel fuel.

The housing 10 includes an upper tubular casing element 12 and a transversely disposed upper end wall 14 which has an internally threaded peripheral zone 16 defining a socket and screwed onto a threaded portion at the upper end of the casing element 12. A seal in the form of an O-ring 18, of resilient material such as rubber, is provided between the casing element 12 and the end wall 14.

The housing also includes a lower tubular casing element 20 which has a cylindrical annular wall along the major part of its height and is closed at its bottom region by a domed end. The lower casing element 20 is spaced from the upper casing element 12 by an annular inlet ring 22 and secured to the element 12 by bolts 24 passing through the ring 22 and clamping two annular clamping rings 26 against the ring 22 and against flanges 28 on the upper casing 12 and lower casing 20. O-ring seals 30 are provided for sealing between the flanges 28 and the ring 22.

A filter means is provided in the housing and includes a filter element 32 generally in the form of an open ended cylindrical foraminous screen 34 of a fine gauge material such as stainless steel. The element 32 has a transversely disposed upper end wall 36 of synthetic plastic material and an annular bottom flange 38 secured to the end wall 36 by four vertical ribs 40. The foraminous screen 34 is connected to the ribs 40 and extends the full length thereof, being connected at the upper and lower ends of the screen 34 to the upper end wall 36 and bottom flange 38, respectively, so as to provide a screened enclosure through which liquid may pass for the purpose of filtration and separation.

The filter element 32 is maintained in position by a spring 42 which is positioned around a boss 44 at the center of the casing end wall 14 and acts against the end wall 36 of the element 32. The flange 38 is dimensioned so that it is substantially a sliding fit within the interior of casing element 12 and an O-ring 46 provides a seal between the flange 38 and element 12. The boss 44 contains an outlet 48 which communicates with an outlet chamber 50 formed exterior to the filter element 32, the outlet chamber 50 being defined by the side walls of the casing element 12 and the end wall 14 as well as the exterior surfaces of filter element 32.

A settling chamber 52, including a settling zone 54 and a displacement zone 55, is formed within the housing 10, extending from the interior of lower casing element 20 upwardly to include the interior of filter element 32. Thus a portion of the settling chamber 52 is surrounded by the outlet chamber 50, and the foraminous filter screen 34 provides a filtration and flow path between the settling chamber 52 and the outlet chamber 50.

Figure 3:
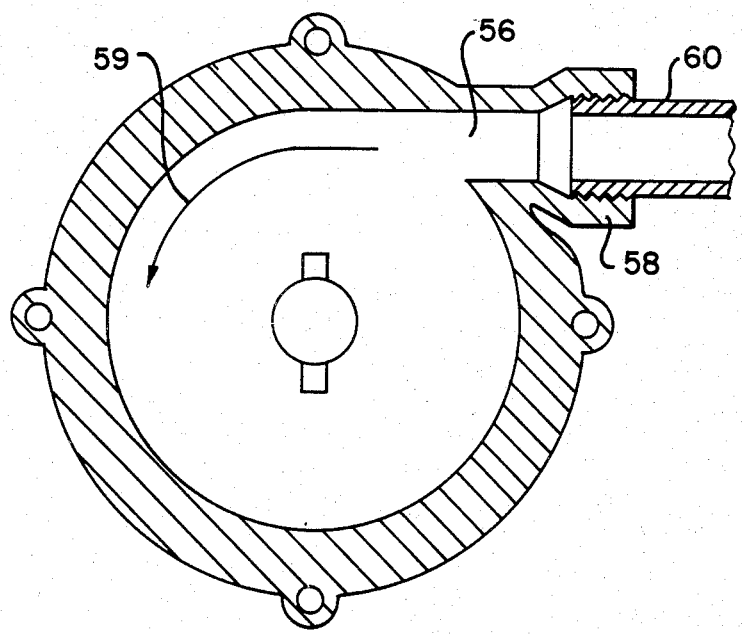
FIG. 3 is a sectional plan view on line III—III of FIG. 1.
Figure 4:
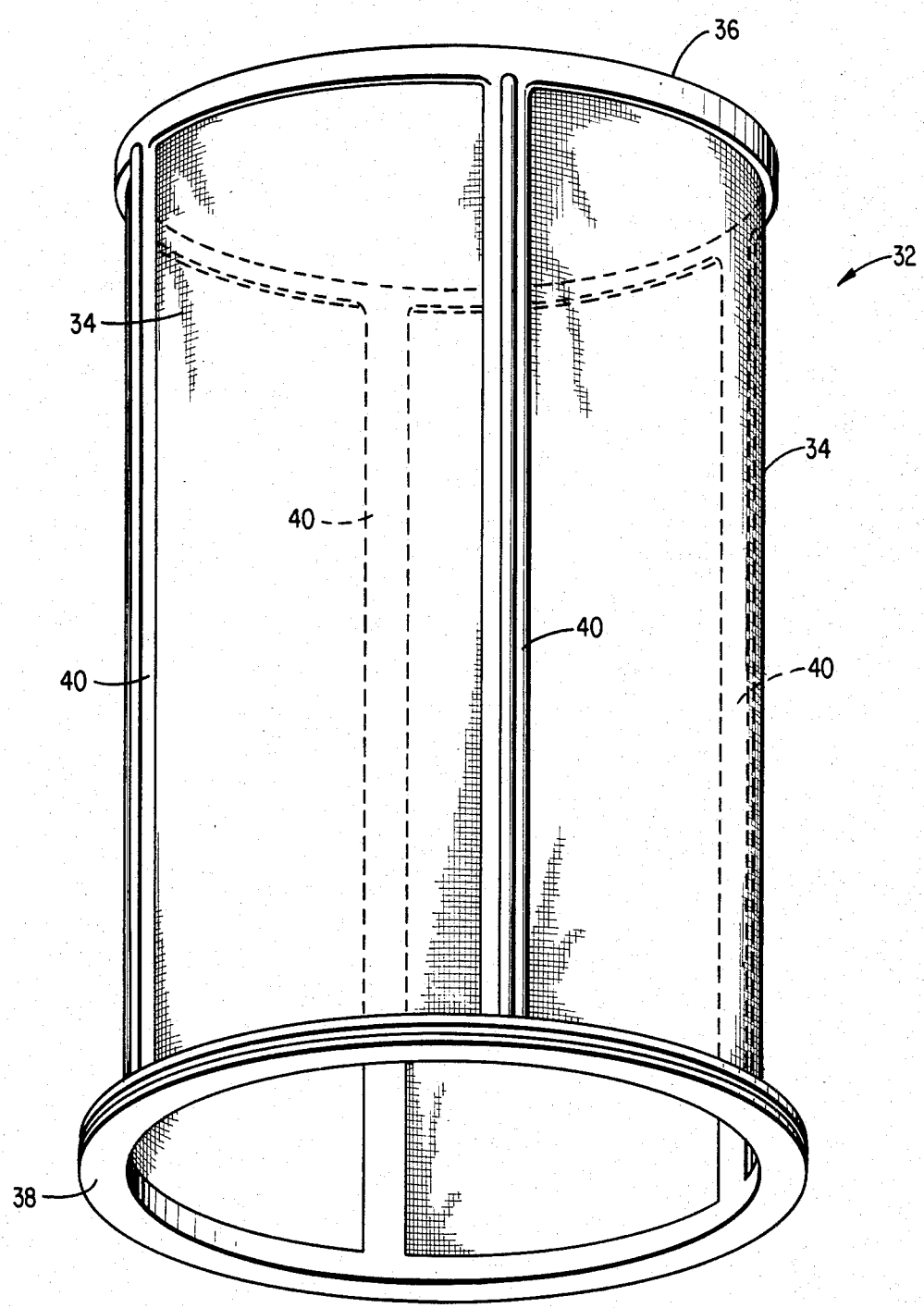
FIG. 4 is a perspective view of the cylindrical filter screen employed in the present invention.

An inlet passage 56 is defined by a tubular part 58 of the ring 22 and forms and inlet extending tangentially into the settling chamber 52 for directing fluids into the settling chamber so that such fluids initially flow alongside the inner wall surface of the housing 10 as indicated by arrow 59 in FIG. 3. A supply tube 60 is fitted into the tubular part 58 of the ring 22 and forms an extension of the inlet passage 56.

With the inlet passage 56 located tangentially to the chamber 52, the fluid flow within the chamber 52 will be rotational, extending throughout the length of the chamber 52 from the lower end of the casing element 20 to the top wall 36 of the filter element 32.

The settling zone 54 of the settling chamber 52 includes that portion of the chamber 52 located below the inlet 56. In this lower region, while the general movement of liquid is rotational, there is no displacement of liquid once the region is initially filled, except for such quantities of foreign liquid as settle there.

The displacement zone 55 of the settling chamber 52 includes that portion of the chamber 52 located from the inlet 56 upwards to the filter end wall 36. In this upper region, the general direction of flow is also rotational, but there is a continuous displacement of liquid from the inlet 56 upwardly toward the outlet 48.

The bottom of lower casing element 20 includes an insert 62 screwed into the main end portion of the casing 20 and sealed by an O-ring 64. The insert 62 has an upwardly extending central column 66 which is surrounded by a float 68 having a specific gravity which is greater than that of the supply liquid but less than that of the foreign liquids to be received within the settling zone 54. The float 68 is provided at its upper end with a pair of spaced magnets 70 on opposite sides of the column 66 and the column contains a reed switch 72 responsive to the magnets 70 so that the reed switch closes when the float is raised to a sufficient extent.

A drain passage 74 passes through the insert 62 and through a plug 76 screwed into the insert 62. The plug 76 has a closure element 78 for engaging a valve seat in the insert to close the passage 74. The closure element 78 is held in place by webs 80. The plug 76 and insert 62 thus provide a valve 82 for enabling the settling zone 54 of chamber 52 to be drained.

In order to enable the device to be connected to an electrical signal circuit for causing a warning signal to be emitted in response to closure of the reed switch and thus to indicate that the valve 82 should be opened to drain the zone 54, contacts 84 connected to the reed switch are provided for connection to the electrical signal circuit.

When the device is connected into a liquid supply line, liquid is supplied into the device through the supply pipe 60 and inlet passage 56 and flows into the settling chamber 52 in the direction of arrow 59 in FIG. 3. The liquid thus sets up a rotational flow within the settling chamber.

When a large amount of water is present, for example, in diesel fuel, it is found that the water can settle to some extent in the pipe 60 and this water will fall towards the bottom of the settling zone 54 when the flowing liquid enters the settling chamber. Larger droplets within the liquid also tend to fall into the settling zone 54.

Smaller droplets may be carried by the liquid flow and, if they do not fall into the settling zone 54 under the action of gravity, will follow a circular path within the settling chamber 52 and rise through the displacement zone 55 into the interior of the filter element 32. Here they tend to move against the filter screen 34 and to rise upwardly towards the top of the filter element 32. The foreign liquids tend to agglomerate as they flow and to carry small dirt particles with them. When the agglomerated droplets are of sufficient size, they fall downwardly into the settling zone 54. Those droplets that reach the top of the filter element 32 tend to accumulate and may move inwardly along the top of the filter element until they are of sufficient size to fall downwardly into the settling zone 54.

As foreign liquids accumulate within the settling zone 54, the float 68 rises and, when it has risen to a sufficient extent, the reed switch 72 is closed by the action of the magnets 70. This closure of the reed switch is detected by the electrical signal circuit connected to the contacts 84 and a warning signal is emitted, indicating that the valve 82 must be opened to drain the settling zone 54.

In one embodiment of the invention, the lower casing element 20 has an inner diameter of approximately 4¾ inches and the height of the portion of the settling chamber 52 from the inner bottom of the lower casing 20 to the top of the flanges 28 of upper casing 12 is approximately 6 inches. The filter element 32 has an inner diameter of approximately 3⅝ inches and an inner height from the bottom of flange 38 to the end wall 36 of approximately 5¼ inches. In this embodiment, the inlet passage 56 has an interior diameter of approximately ⅞ inch, the upper casing 12 has an inner diameter of approximately 4¾ inches and the height of the outlet chamber 50 from the top of flange 38 to end wall 14 is approximately 5¾ inches. The vertical distance between the inlet 56 and the top of the central column 66 of the float mechanism is approximately 2½ inches. The filter screen 34 may, for example, be constructed of 120 mesh stainless steel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A filtration and separation device for use in separating a foreign liquid and particulate matter contained in a supply liquid, the foreign liquid having a specific gravity greater than that of the supply liquid, wherein said device provides an unobstructed settling chamber which is of maximum volume relative to the overall dimensions of the device, said device comprising:

a generally cylindrical housing having side walls and a top and bottom wall at the respective ends thereof; a cylindrical filter screen member mounted coaxially within said housing, said filter screen member being open at the lower end and having a top wall and foraminous side walls; a mounting means adjacent the lower end of said filter screen member for mounting said filter screen member in a spaced relationship with respect to the walls of said housing, said mounting means providing a fluid tight seal between said housing and said filter screen member adjacent the lower end of said filter screen member; said filter screen member together with said housing defining a settling chamber and an outlet chamber within said housing, said settling chamber extending from the bottom wall of the housing upwardly through the interior of the filter screen member to the top wall thereof, said outlet chamber including the interior portion of the housing located exterior to said filter screen and above said mounting means; means defining an inlet attached in tangential relation to said housing at a location below said filter screen member and leading into said settling chamber; means defining an outlet in the top wall of said housing; said housing being unobstructed across the width of said housing from one wall of the housing to the other in proximity to the horizontal plane of the tangential inlet, said settling chamber being unobstructed across the width thereof upwardly of said horizontal plane of the tangential inlet, means defining a settling zone formed from a substantial portion of the volume of said settling chamber and located below the horizontal plane of the tangential inlet, to permit settling of said particulate matter and said foreign liquid having a specific gravity greater than that of the supply liquid, the larger drops of foreign liquid being allowed to fall directly into the settling zone without being broken up against any internal obstruction.

2. The device of claim 1 wherein spring biasing means extends between the top wall of said housing and the top wall of said filter screen member.

3. The device of claim 2 wherein said spring biasing means is in the form of a coiled spring, said spring being coiled about a vertical axis, said spring being positioned so as to allow liquid to flow through the coils thereof to the outlet in said top wall of the housing.

4. The device of claim 3 wherein said coiled spring is positioned at its upper end around a boss located in the top wall of said housing.

5. The device of claim 4 wherein the outlet in the top wall of said housing is positioned in the center portion of said housing top wall and wherein said boss surrounds said outlet.

6. The device of claim 1 wherein the top wall of said housing is vertically spaced from the top wall of said filter screen member to allow fluid flow over the top wall of said filter screen member to said outlet in the top wall of said housing.

7. The device of claim 1 wherein said outlet in the top wall of said housing is positioned in the center portion of said housing top wall.

8. The device of claim 1 wherein said inlet is so arranged with respect to said filter screen member and said outlet as to provide for upward flow of liquid from said inlet through said filter screen member, from the interior to the exterior thereof, thence to said outlet.

9. The device of claim 1 wherein the tangential inlet and the outlet are so located as to provide for upward displacement of liquid with generally rotational flow of the total body of liquid within the device.

10. The device of cliam 1 wherein said mounting means includes a flange which extends circumferentially around the lower end portion of said filter screen member, said flange being secured at its outer end surfaces to the interior side walls of said housing to form a fluid tight seal.

11. The device of claim 1 wherein said tangential inlet lies in a plane which is generally perpendicular to the longitudinal axis of said housing.

12. The device of claim 1 wherein the lower end of said filter screen member is open across the entire width thereof and said top wall of the filter screen member is solid across the entire width thereof.

13. The device of claim 1 further including detecting means operatively associated with the settling chamber for detecting the presence of a foreign liquid at a predetermined level in said settling chamber, said detecting means being connectable to an electrical signal circuit for causing a signal in response to detection of said foreign liquid.

14. A filtration and separation device for use in separating a foreign liquid contained in a supply liquid, wherein the foreign liquid has a specific gravity greater than that of the supply liquid, said device having a float warnng mechanism for detecting the presence of a predetermined level of said foreign liquid in the lower interior portion of said device, comprising:

a generally cylindrical housing having side walls and a top and bottom wall at the respective ends thereof; said housing having an inlet mounted in tangential relation thereto and an outlet mounted therein and filter means mounted in the flow path between said inlet and outlet; an upwardly extending central column mounted in said bottom wall in coaxial alignment with the vertical axis of said housing; a float member mounted on the exterior of said column, said float member being freely movable in a vertical direction on said column and being freely rotatable about the vertical axis of said column; said float member having a specific gravity which is greater than that of the supply liquid but less than that of the foreign liquid; said float member being provided with a pair of magnets located on opposite sides of the column; and switch means mounted on said column, said switch means being responsive to the magnets so that said switch means closes when the float member is raised to a predetermined level, while said float member is in a rotating or non-rotating condition, said housing being unobstructed across the width of said housing from one wall of the housing to the other in proximity to the horizontal plane of the tangential inlet, means defining a settling zone formed from a substantial portion of the volume of said housing and located below the horizontal plane of the tangential inlet to permit settling of said foreign liquid, said float member being located in said settling zone and out of the flow path between said inlet and outlet.

15. The device of claim 14 wherein said pair of magnets are mounted in the upper end portion of said float member.

16. The device of claim 14 wherein said float member extends around the entire circumference of said central column.

17. The device of claim 14 further including electrical contact means mounted in said housing for connection to an electrical signal circuit.

18. The device of claim 14 further including drain means mounted in said housing.

19. The device of claim 14 wherein said switch means includes a reed switch.

* * * * *